United States Patent [19]

Yajima

[11] Patent Number: 4,739,873
[45] Date of Patent: Apr. 26, 1988

[54] TENSION SPRINGS SEPARATION DEVICE
[75] Inventor: Yutaka Yajima, Akishima, Japan
[73] Assignee: Tachi-S Co., Ltd., Japan
[21] Appl. No.: 927,356
[22] Filed: Nov. 4, 1986
[51] Int. Cl.⁴ .................... B65G 27/02; B65G 47/24
[52] U.S. Cl. ................................ 198/391; 198/953
[58] Field of Search ................ 198/391, 953; 414/116
[56] References Cited

U.S. PATENT DOCUMENTS 3,042,181  7/1962  Rise .............................. 198/953 X
4,369,874  1/1983  Kettner et al. ................ 198/953 X

FOREIGN PATENT DOCUMENTS 0108384  8/1979  Japan .............................. 198/953

Primary Examiner—L. J. Paperner
Assistant Examiner—D. Glenn Dayoan
Attorney, Agent, or Firm—Oldham, Oldham & Weber Co.

[57] ABSTRACT

A tension springs separation device for use in a system for automatically mounting tension springs to a seat frame of a seat for an automobile. In the separation device, there are provided two narrow portions in a feed passage in a part feeder, each of which has a width permitting only one tension spring to pass therethrough in the longitudinal direction, and there are provided two projected ramp portions each of which has a level difference slightly larger than the outside of the tension spring, whereby a large number of tension springs loaded into the part feeder can be sent out one by one sequentially.

9 Claims, 3 Drawing Sheets

TENSION SPRINGS SEPARATION DEVICE

BACKGROUND OF THE INVENTION

1. Field of the Invention

The present invention relates to a tension springs separation device and, in particular, to such separation device suitable for use in a tension spring automatic mounting system which mounts tension springs automatically in assembling a pad receiving member to a seat frame of a seat.

2. Description of the Prior Art

In seats for vehicles, there are employed some kinds of cushion structures, a typical example of which is disclosed in Japanese Utility Model Publication No. 5882 of 1972.

Specifically, in the disclosed cushion structure, there is employed a so-called reed-screen-like pad receiving member which is formed by extending a plurality of wires round across two side members between the two side surfaces of a seat frame disposed internally of the seat, and then inserting spacer members between the thus extended wires; and, the pad receiving member is provided elastically by means of a plurality of tension springs at the two sides thereof, so that such elastic provision of the pad receiving member can offer a comfortable cushioning effect.

Conventionally, an operation to mount the tension springs in assembling the pad receiving member to the seat frame has been performed manually. However, recently, there is proposed a tension spring automatic mounting system which is adapted to carry out the mounting operation automatically by use of an industrial robot.

In the tension spring automatic mounting system, the industrial robot is used to mount the tension springs that are separated individually from one another. However, since every tension spring is provided with two hook portions at the two ends thereof, while they are stored, the tension springs are entangled with one another at the respective hook portions thereof. Therefore, when mounting the tension springs, they must be separated from one another by means of a separation device.

A separation device of this type for separation of the above-mentioned entangled tension springs is disclosed in Japanese Utility Model Publication No. 124775 of 1974.

That is, in the tension springs separation device, a sorter member for dropping down the entangled tension springs is located in a feed passage of a part feeder, an enclosure member is located such that it is opposed to the sorter member, and there formed opposed blast holes in one end of the enclosure member, which blast holes are connected with a blast device, whereby the tension springs dropped down onto the bottom plate portion of the enclosure member are blown off by the air jetted out of the blast holes so that they are dropped down from a drop hole of the enclosure member onto the bottom portion of the part feeder.

However, the above-mentioned tension springs separation device is found to have some drawbacks to be solved. For example, it is complicated in structure due to the fact that the blast device is employed to blow off the tension springs. The separation device also requires a high manufacturing cost.

SUMMARY OF THE INVENTION

The present invention aims at eliminating the drawbacks found in the above-mentioned prior art tension springs separation device.

Accordingly, it is an object of the invention to provide a tension springs separation device which is simple in construction and is capable of separating the tension springs accurately.

In attaining the above object, according to the invention, there are provided at desired positions in a feed passage of a part feeder narrow portions each of which has a width permitting only one tension spring to pass in the longitudinal direction, and also projected portions each having a desired difference in level.

In the invention, when the part feeder is vibrated, then the tension springs are caused to move along the feed passage of the part feeder. In this operation, when the tension springs are passed through the narrow portions in the feed passage of the part feeder, the tension springs that are moved in such a manner that they are overlapping one another in the lateral direction, more particularly, all of such tension springs except one that are protruding beyond the narrow portions, are caused to fall down to the bottom portion of the part feeder, due to the fact that the width of each of the narrow portions is defined so as to allow only one tension spring to pass. Also, when the tension springs with their end hooks being entangled with each other are passed through the projected portions in the feed passage of the part feeder, the level difference of the projected portions serves to get the tension springs out of touch, so that the entangled hook portions thereof can be separated from each other.

The above and other related objects and features of the invention will be apparent from a reading of the following description of the disclosure found in the accompanying drawings and the novelty thereof pointed out in the appended claims.

DETAILED DESCRIPTION OF A PREFERRED EMBODIMENT OF THE INVENTION

An embodiment according to the invention will be described below in connection with the accompanying drawings when it is applied to a tension spring mounting system which is adapted to mount tension springs automatically in assembling a pad receiving member to a seat frame of a seat.

Figure 1:
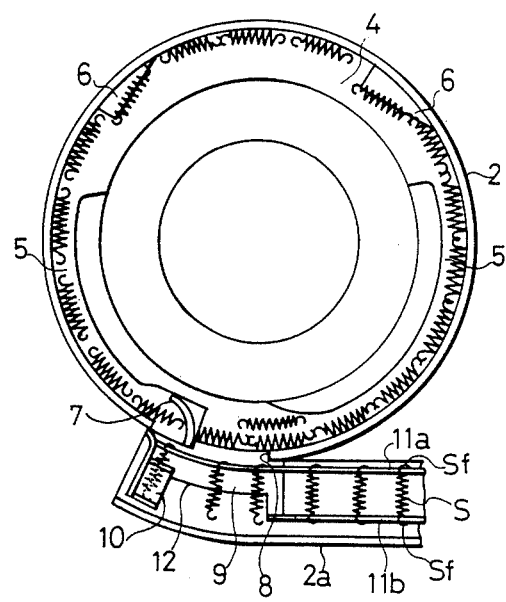
FIG. 1 is a plan view of a tension springs separation device constructed in accordance with the invention.
Figure 2:
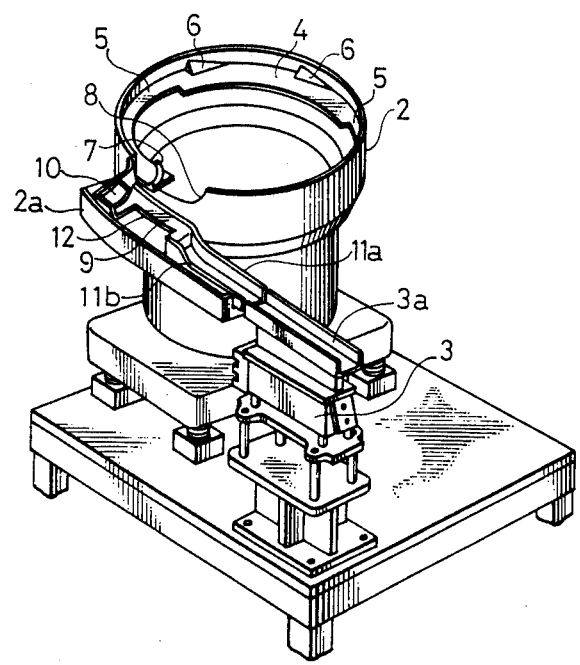
FIG. 2 is a perspective view of the above separation device.
Figure 3:
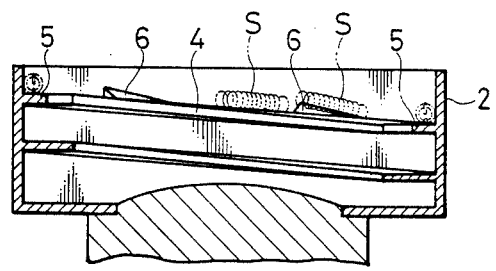
FIG. 3 is a longitudinally section view of the above separation device.
Figure 4:
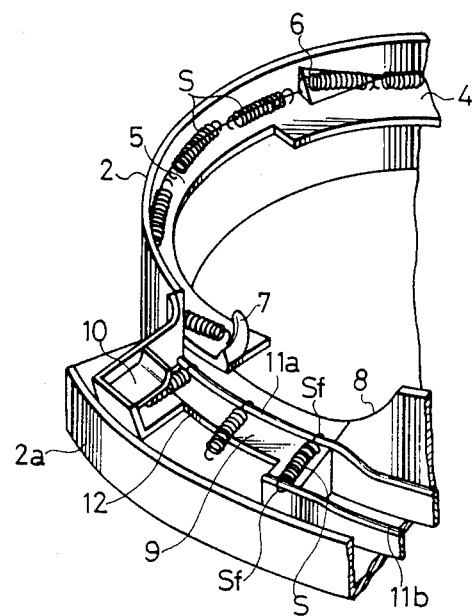
FIG. 4 is an enlarged perspective view of main portions of the above separation device; and, FIG. 5 is a schematic front view of a tension spring automatic mounting system to which the separation device of the invention is applied.
Figure 5:
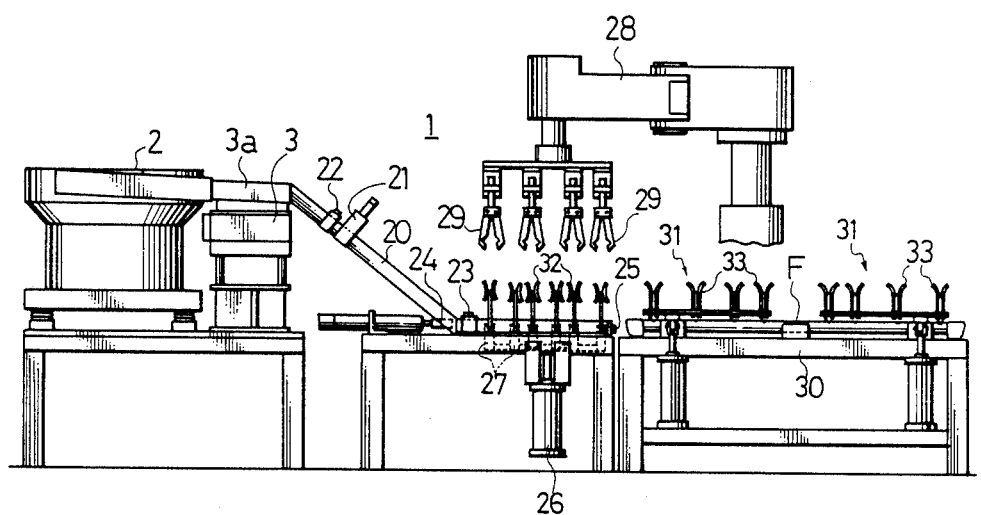

In FIGS. 1 through 5, reference numeral (1) stands for an entire tension spring automatic mounting system, and (2) designates a part feeder which supplies tension springs S each having at the two ends thereof two hook portions Sf extending in the same direction. This part feeder (2) is provided with a separation mechanism for separation of the tension springs S, whereby a large number of tension springs S input therein can be individually separated from one another so as to be fed out into a straight line feeder (3).

The part feeder (2), which has a cylindrical form with a bottom, is provided with a feed passage (4) extending spirally from the bottom portion up to the opening of the upper surface on the internal peripheral surface thereof. When the part feeder (2) is vibrated in the same direction, then the tension springs S that have been thrown into the bottom portion of the part feeder (2) are caused to move along the inner side wall of the part feeder (2). The feed passage (4) is provided in the two positions thereof with two narrow portions (5) each having a width substantially equal to the outside diameter of the tension spring S. Also, the feed passage (4) is provided in another two positions thereof with two projected portions (6) each projecting in an inclined manner over both the internal side wall of the part feeder (2) and the upper surface of the feed passage (4). Each of the projected portions (6) has a difference in level which is defined to be slightly greater than the outside diameter of the tension spring S.

The feed passage (4) is provided in the terminal end thereof with a raised butting guide member (7) which is bent in an arc shape extending from the progressive direction of the feed passage toward the outside thereof.

The part feeder (2) is also formed in the peripheral wall with a cutaway portion (8) of a required length so as to allow the terminal end of the feed passage to be exposed externally. From under the cutaway portion (8), there is provided a receiving portion (2a) which is connected to the bottom portion of the part feeder (2). There is provided an inclined surface portion (9) which is located upwardly of the receiving portion (2a) and inclined downwardly from the cutaway portion (8). The inclined surface portion (9) is provided in one end thereof with a U-shaped box (10) of the same angle of inclination with the inclined surface portion (9), which box (10) is located so as to correspond to the butting guide member (7) at the terminal end of the feed passage (4). The box (10) is formed to have such a depth that about half of the tension spring S can be immersed in the box (10) and it has an upper-side surface which is provided with a leading end bent upwardly so that the box is open toward the part feeder.

The inclined surface portion (9) is provided with a rail member (11a) extending from an intermediate position between the opening of the box (10) and the terminal end of the feed passage (4) in a manner to run along the peripheral wall of the part feeder (2).

Also, the inclined surface portion (9) is formed in the portion thereof adjacent to the box (10) with a cutaway drop portion (12), and from the lower edge of the other end thereof opposed to the box (10) there is extended a rail member (11b) which runs parallel to the rail member (11a). The terminal ends of both rail members (11a) and (11b) are respectively made to correspond to the rear end of a parallel guide (3a) provided in the straight line feeder (3).

When a large number of tension springs S are fed into the thus constructed part feeder (2) and the part feeder (2) is then vibrated, then, due to this vibration, the tension springs S are transferred in succession in the longitudinal direction toward the opening of the upper surface from the bottom portion of the part feeder along the feed passage (4).

Then, when the tension springs S are passed through the narrow portions (5) in the feed passage (4), since the width of each of the narrow portions (5) is defined as equal to the width of one tension spring S, the tension springs S that happen to protrude beyond the narrow portions are to be dropped down to the bottom of the part feeder (2), so that the tension springs S are made to stand in a line.

The thus lined tension springs S are then passed through the projected portions (6), where the entangled end hooks Sf thereof are separated from each other.

Specifically, when the tension springs S with the end hooks Sf thereof entangled with each other run on and pass through the projected portions (6), the tension spring S that has passed through the projection portion (6) earlier is shifted in level relative to its following tension spring S by means of the level difference of the projected portion (6), thereby disconnecting the entangled end hooks Sf of the two tension springs S, so that the two tension springs S are separated from each other.

The disconnection of the end hooks Sf is performed at the two projected portions (6) located two different positions. Then, the thus separated tension springs S are butted against the butting guide member (7) at the terminal end of the feed passage (4) and are rotated along the arc-shaped surface of the butting guide member (7) so that they are turned in the outside direction. This finally separates the tension springs S individually. Then, the thus turned tension springs S are caused to fall at the terminal end portion of the feed passage (4) into the box (10), when one end hook Sf of the tension spring S is brought into engagement with the rail member (11a). In this operation, if the end hooks Sf of the tension springs S remain entangled and are not disconnected from each other, the end hook Sf will not be brought into engagement with the rail member (11a). Therefore, such entangled tension springs S are caused to slip off from the inclined surface portion (9), that is, they are caused to fall down from the drop portion (12) into the bottom portion of the receiving portion (2a), and are then returned into the part feeder (2) again.

The tension spring S with one end hook Sf thereof engaged with the rail member (11a), due to the vibration of the part feeder (2), can be moved further on the inclined surface portion (9) along the rail member (11a), and, when it has passed through the drop portion (12), the other end hook Sf thereof is also brought into engagement with the rail member (11b). That is, from here, with both end hooks Sf thereof being engaged with the rail members (11a) and (11b), the tension spring S is sent out onto the parallel guide (3a) of the straight line feeder (3) disposed in the direction of extension of the rail members (11a) and (11b).

The tension spring S that has been sent out onto the straight line feeder (3) from the part feeder (2) in this way is then forwarded due to the vibration of the straight line feeder (3) to a supply chute (20) disposed so as to correspond to the front end of the parallel guide (3a), and further the tension spring S forwarded to the supply chute (20) is once stocked in a delivery device (21) located midway in the inclined portion of the supply chute (20) until the number of the tension springs S stored here reaches a predetermined number. When the number of the tension springs reaches the predetermined number, then this is sensed by a sensor (22), which causes the delivery device (21) to operate. As a result of this, a required number of tension springs S are dropped down.

The tension springs S that have fallen down along the inclined portion of the supply chute (20) are pushed out to a catch portion of a set device to be described below, by means of operation of a push-out body (24) caused by perception of an adjacent switch (23).

The above-mentioned operation is performed repeatedly so that the tension springs S are supplied successively to the front end portion of the supply chute (20). A cylinder (26) is operated by perception of an adjacent switch (25) provided at the front end of the supply chute (20), causing take-out members (27) to move up, so that a required number of tension springs can be taken out simultaneously. When the required number of tension springs S are taken out in this manner, the set device (28) comprising an industrial robot is then operated to cause a manipulator (29) provided at the front end thereof to catch a plurality of tension springs S at the same time. After then, the caught tension springs S are transferred to tension spring mounting portions (31) of a seat frame F placed on and fixed to a mounting table (30) so that the tension springs S can be mounted in place.

During this operation, the end hooks Sf of the tension springs S, that is, the inclination thereof is rectified by each of first direction restriction members (32) which are respectively located correspondingly to and above the take-out members (27). Also, in mounting, the end hooks Sf of the tension springs S are guided by second direction restriction members (33) respectively disposed so as to correspond to the tension spring mounting portions (31) of the seat frame F, so that the tension springs S can be mounted smoothly.

Accordingly, in the tension spring automatic mounting system to which the separation device in accordance with the present invention is applied, an operation to mount the tension springs to the seat frame, which has been performed manually in the prior art, can be performed in a completely automatic manner.

As has been described hereinbefore, according to the tension springs separation device of the invention, due to the fact that the narrow portions provided therein serve to cause the tension springs that protrude beyond the narrow portions to fall down to the bottom portion of the part feeder and also due to the fact that the projected portions provided therein serves to disconnect the entangled end hooks of the tension springs, the tension springs can be separated positively from each other. Also, since the present tension springs separation device is very simple in construction, it can be manufactured at lower costs. The present tension springs separation device is greatly effective, especially when it is applied to the tension spring automatic mounting system.

What is claimed is:

1. A sparation device for separating tension springs from each other, comprising:
   two narrow portions located in an upwardly inclined spring feed conduit of a part feeder and having a width permitting only one tension spring to pass therethrough in the longitudinal direction, said tension spring having two hook portions at the two ends thereof; and,
   two projected ramp portions provided in said conduit of said part feeder which cause a temporary elevation of the tension springs moving over said ramp portions relative to, the level of the tension springs immediately before and after passing said ramp portions characterized in that, when said tension springs are transferred, in said narrow portions the tension springs that protrude overlappingly beyond said narrow portions are caused to fall down to the bottom portion of said part feeder, and the end hook portions of two tension springs entangled with each other can be separated from each other at said projected ramp portions.

2. A tension springs separation device as set forth in claim 1 which includes vibrating means for moving said tension springs along said spring feed conduit, wherein said part feeder has a cylindrical configuration with a bottom, and is provided in the internal peripheral surface thereof with said spring feed conduit spirally extending from the bottom portion thereof up to an opening portion in the upper surface thereof, and wherein, when said part feeder is vibrated by said vibrating means in the peripheral direction thereof, said tension springs are moved upwardly along said conduit.

3. A tension springs separation device as set forth in claim 1, wherein each of said narrow portions has a width substantially equal to the outside diameter of said tension springs, and each of said projected ramp portions causes said tension springs to be temporarily elevated to a height above the bottom surface of said conduit slightly greater than the outside diameter of said tension spring.

4. A tension springs separation device as set forth in claim 1, wherein said projected ramp portions are formed so as to rise gradually in the direction of movement of said tension springs.

5. A tension springs separation device as set forth in claim 1, wherein said spring feed conduit is provided at the terminal, discharge end thereof with a projected butting guide member which is bent in an arc manner outwardly from the progressive direction of said spring feed conduit, and wherein said tension springs are forced against said butting guide member, turning their directions, while they are moving from said terminal, discharge end of said conduit.

6. A tension spring separation device as set forth in claim 1, wherein at said terminal, discharge end of said spring feed conduit there is formed a cutaway portion so that said terminal, discharge end can be projected in the outer periphery of said part feeder, and below cutaway portion there is provided a receiving portion integrally connected to, and in direct communication with the bottom portion of said part feeder, and there is provided a downwardly inclined surface portion between said receiving portion and said cutaway portion, whereby because the tension springs with their end hooks entangled with each other cannot present a hook to be engaged, the tension springs are caused to fall down from said downwardly inclined surface portion to said receiving portion, and further to the bottom portion of said part feeder.

7. A tension springs separation device as set forth in claim 1, wherein in one end of said inclined spring feed conduit there is provided a U-shaped, open-ended box having the same angle of inclination as said inclined spring feed conduit, and wherein a projected butting guide member at the terminal, discharge end of said conduit adjoins the open end of said box and urges tension springs moving along said conduit into said box, said box having such a depth that substantially half of said tension spring can be inserted in said box, said box including an upper surface, the leading end of which is bent upwardly and open.

8. A tension springs separation device as set forth in claim 1 having a downwardly inclined surface portion provided with rail means extending along the peripheral wall of said part feeder from an intermediate position between an opening of in a U-shaped box located adjacent the terminal, discharge end of said conduit, and said terminal, discharge end of said conduit.

9. A tension springs separation device as set forth in claim 1, which includes a rail means comprising two rail members which extend parallel to each other from the lower edge of the end of a downwardly inclined surface portion opposite to a U-shaped box located adjacent the terminal, discharge end of said conduit, and in which a straight line feeder is connected to the terminal ends of said two rail members.

* * * * *